United States Patent
Georgescu et al.

(10) Patent No.: US 7,395,301 B2
(45) Date of Patent: Jul. 1, 2008

(54) METHOD AND PROCESS FOR DETERMINING A QUOTIENT

(75) Inventors: Adrian Georgescu, Palo Alto, CA (US); Roland L. Arajs, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 895 days.

(21) Appl. No.: 10/454,790

(22) Filed: Jun. 3, 2003

(65) Prior Publication Data

US 2004/0246955 A1    Dec. 9, 2004

(51) Int. Cl.
*G06F 7/52* (2006.01)

(52) U.S. Cl. .................................................. 708/650
(58) Field of Classification Search .................. 708/650
See application file for complete search history.

(56) References Cited

U.S. PATENT DOCUMENTS

| | | | | |
|---|---|---|---|---|
| 5,140,544 A | * | 8/1992 | Lin et al. | 708/650 |
| 6,529,929 B2 | * | 3/2003 | Hong | 708/650 |
| 2004/0071157 A1 | * | 4/2004 | Feldman et al. | 370/463 |

OTHER PUBLICATIONS

Intel Corporation, "Intel IXP1200 Network Processor Family Hardware Reference Manual," 272 pgs., (Aug. 2001).

* cited by examiner

*Primary Examiner*—Tan V Mai
(74) *Attorney, Agent, or Firm*—Fish & Richardson P.C.

(57) ABSTRACT

A method executed in a computing device for dividing by the integer number 48, the method includes receiving a number, and using the number in a combination of four additions and four bit-level shifts to produce a quotient representing the number divided by the integer number 48.

44 Claims, 3 Drawing Sheets

METHOD AND PROCESS FOR DETERMINING A QUOTIENT

TECHNICAL FIELD

This application relates to a method and process for determining a quotient.

BACKGROUND

Some systems (e.g., communication systems, data processing systems, etc.) distribute data in packets for transmitting the data throughout a network such as a local area network (LAN), a wide area network (WAN), or other similar networking scheme. In some networking schemes various amounts of data are included in each of the transmitted data packets. Typically, data packet length increases as more data is included in the data packet, although, the length of the data packet may also depend on the transmission capability (i.e., transmission rate, bus width, etc.) of the network. Alternatively, some networks, such as asynchronous transfer mode (ATM) networks, transfer fixed-length data packets known as cells. Each fixed-length cell has a length of 53 bytes and includes a header that is 5 bytes in length and a data payload that is 48 bytes in length. To transfer a data packet transmitted on a network, which allows various data packet lengths, to an ATM network, which only transmits fixed-length cells, the data packet is converted into one or more fixed-length cells. To convert the data packet, the number of fixed-length cells needed to store the data included in the data packet is determined by dividing the length of the data packet by the fixed-length cell payload length (i.e., 48 bytes) during a time period budgeted for processing each data packet.

DESCRIPTION

Figure 1:
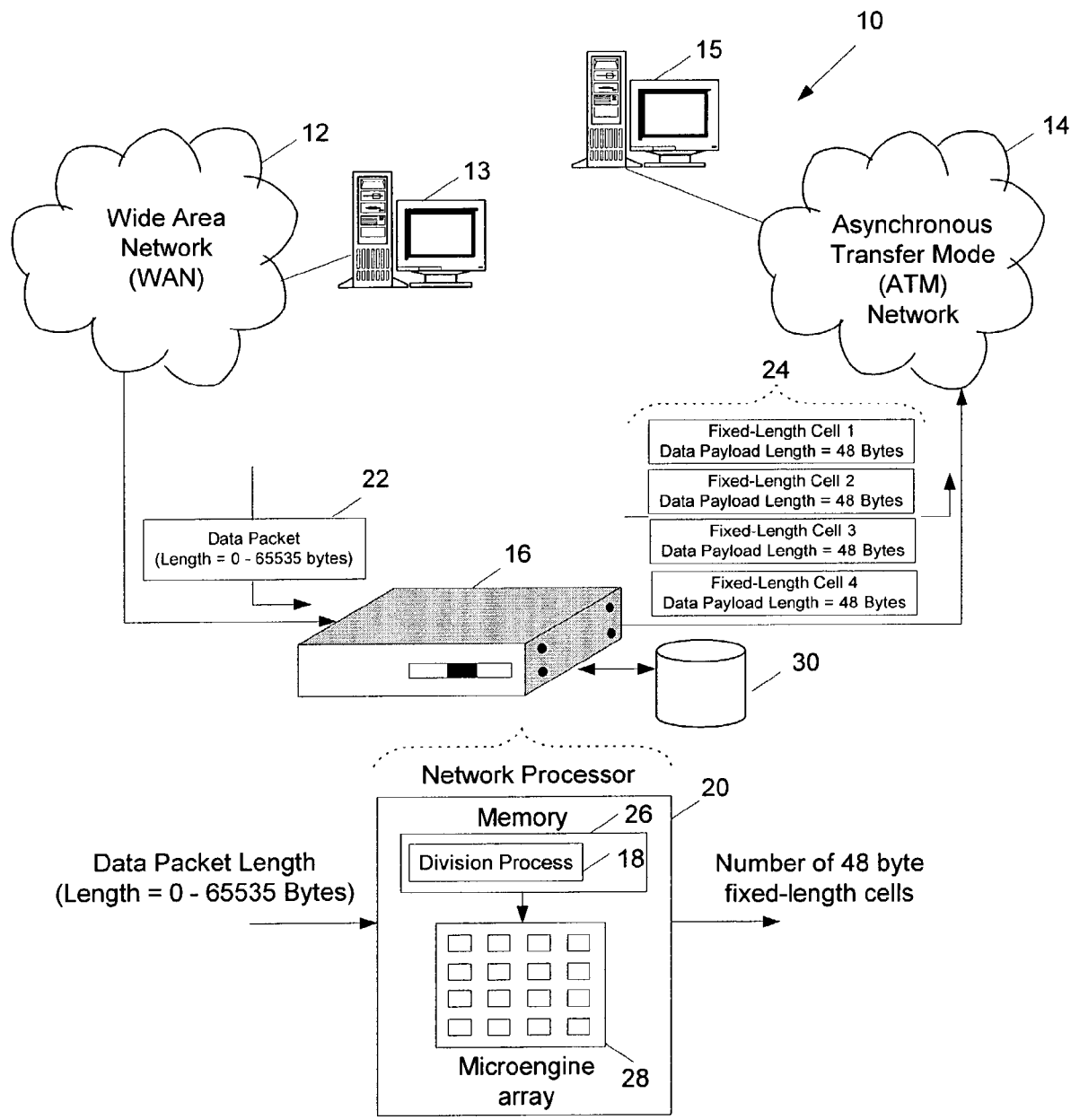
FIG. 1 is a block diagram depicting a system for transferring data packets from a WAN network to an ATM network.

Referring to FIG. 1, a system 10 for transferring one or more data packets from a wide area network (WAN) 12 to an asynchronous transfer mode (ATM) network 14 includes a router 16 that includes a division process 18 that resides in memory 26 (e.g., ROM, RAM, SRAM, DRAM, etc.) included in a network processor 20 and is executed by an array of microengines 28 also included in the network processor. In this example, the router 16 provides data transfer between computer systems 13, 15 respectively in communication with the WAN 12 and the ATM network 14. Also in this example, a data packet 22 received from the WAN 12 by the router 16 ranges in length between 0 bytes (i.e., 1 byte=8 bits) and 65535 bytes (i.e., $2^{16}-1$ bytes). To distribute the data included in the data packet 22 into one or more fixed-length cells capable of being transmitted on the ATM network 14, the division process 18 determines the number of fixed-length cells needed to hold the data included in the data packet 22. In this example, the data included in the data packet 22 is distributed among fixed-length cells that include 48 byte long data payloads. To determine the number of fixed-length cells, the division process 18 divides the length of the data packet by the integer number "48". In this example, the division process 18 determines that four fixed-length cells 24 are needed for transmitting the data in the data packet 22 on the ATM network 14. However, in other arrangements the division process 18 determines that less than four or more than four fixed-length cells are needed to transmit the data on the ATM network 14. After the number of fixed-length cells is determined, the data in the data packet 22 is distributed among the four fixed-length cells 24 for transmitting on the ATM network 14.

To determine the number of fixed-length cells, the division process 18 includes instructions (e.g., addition, bit-level shift operations, byte-level shift operations etc.) that are associated with an instruction set (e.g., a reduced instruction set computer RISC architecture) specifically used by the array of sixteen programmable multithreaded microengines 28 included in the network processor 20. Since the instruction set is designed for specific use by the array of microengines 28, the received data packet 22 is processed relatively quickly in fewer clock cycles than typically needed to execute instructions associated with a general-purpose processor. Each of the microengines included in the array of microengines 16 have a relatively simple architecture and quickly execute relatively routine processes (e.g., forwarding, converting, etc.) on the received data packets while leaving more complicated processing (e.g., routing table maintenance) to other processing units (not shown) included in the network processor 20 (e.g., StrongArm processor of ARM Limited, United Kingdom). Further, in some arrangements the division process 18 instructions are written in microcode (e.g., machine code), or other similar code language, for specific execution by the array of microengines 28. The division process 18 performs an integral division by the integer number "48" that produces the quotient of the division and truncates the remainder. Also, while the division process 18 in this particular example determines the number of fixed-length cells, in other arrangements, the division process is used by other systems and processes for dividing one or more numbers by the integer number "48."

In system 10 the division process 18 is stored in the memory 26 and executed with the array of microengines 28 included in the network processor 20 included in the router 16. However, in some arrangements the division process 18 is executed on an application-specific integrated circuit (ASIC), a microprocessor, or other similar processing device. Further, in some arrangements, the division process 18 is executed on a network interface card (NIC), a line card, a computer system, or other similar data processing device. Also, alternatively to storing the division process 18 on the memory 26 included in the network processor 20, or another processing device, in some arrangements the division process is stored on a storage device (e.g., a hard drive, CR-ROM, etc.) such as storage device 30 that is in communication with the router 16 and stores other processes (e.g., a data packet receiving process) associated with the router. Additionally, while the network processor 20 includes an array sixteen microengines, in some arrangements an array of more than sixteen or less than sixteen microengines is included in the network processor.

Since some of the instructions included in the division process 18 are tailored for efficient execution by the microengines, the microengine array 28 executes a relatively limited number of simple instructions at relatively high speeds to increase the execution rate of the network processor 20. Additionally, by executing relatively simple instructions (e.g., addition, bit-level shifts, etc.), the network process 20 needs less circuitry to execute the simple instructions than the circuitry for executing slower complex instructions (e.g., division). In this example, the instruction set includes an addition instruction and a bit-level shift instruction that are used in combination for dividing the data packet length by a integer number "48" to determine the number of fixed-length cells with 48-byte data payloads needed to transmit the data included in the data packet 22 throughout the ATM network 14. Further, by using the addition and the bit-level shift instructions from the instruction set, the division of the length of the data packet 22 is completed by executing a combination of four addition instructions and four bit-level shift instructions. Typically each addition instruction and each bit-level shift instruction executes in 1 clock cycle on the network processor 20. So, by executing the division process 18, the quotient of the data packet length divided by the integer number 48 is determined relatively quickly in 8 clock cycles. However, in some arrangements additional clock cycles are used for executing other instructions included in the division process 18 such as instructions for receiving the length of the data packet 22, moving numbers into or out of one or more registers (not shown) associated with the array of microengines 28, or other similar instructions capable of being executed by the network processor 20.

By executing a combination of four addition and four bit-level shift instructions from the instruction set, the quotient of dividing the data packet length by the integer number 48 is quickly determined without executing one or more complex instructions. Additionally, by executing the reduced instruction set instructions on a dedicated processor, such as the network processor 20, processing time is reduced. By reducing the processing time, less clock cycles are needed to execute the four addition and four bit-level instructions for determining the quotient of dividing the data packet length by the integer number 48. Further, by reducing the number of clock cycles needed to determine the number of fixed-length cells, budgeted clock cycles are conserved for additional processing of the data included in the data packet 22. Additionally, by reducing the number of clock cycles, the probability that a received data packet is not processed due to lack of processing time is reduced. Further, by reducing the probability that a data packet is not processed, the probability that a data packet is not transferred onto the ATM network 14 is also reduced.

To execute the division process 18, registers (not shown) included in the network processor 20 are used to hold, move, and perform bit level functions on binary numbers as directed by the instructions executed by the network processor. In this particular example the length of the data packet 22 is represented by a sixteen-bit number, which corresponds to a data packet length between 0 and $2^{16}-1$ (i.e., 65535) bytes. To perform the bit-level functions on the sixteen-bit number, typically 32-bit long registers associated with the network processor 20 are used to execute the instructions included in the division process 18. However, in other arrangements the division process 18 uses registers that are longer or shorter than 32 bits.

An exemplary mathematical proof is set out below to show how the combination of four addition operations and four bit-level shift operations included in the division process 18 can be used for dividing any 16 bit number by the integer number "48."

let $k \in N$ and writing:

$k=48*l+m$ where:

$l, m \in N$ $0 \leq m \leq 47$

If taking:

$k_1 = k+1$ then:

$k_1 = 48*l+m_1$ (1)

where:

$1 \leq m_1 \leq 48$

Choosing two real numbers a, p such that:

$k_1 = 48*p+48*a$ (2)

$p, a \in R$ $$0 < a < \frac{1}{48}$$ (3)

And considering the relations between (1) and (2) then:

$48*l+m_1 = 48*p+48*a$ $48*p = 48*l+m_1-48*a$

Based on relation (3):

$48*l+m_1-1 < 48*p < 48*l+m_1$

Having $p=[p]+\{p\}$ where $[p]$ is the integral part of p and $\{p\}$ is fractional part of p.

$$48*l+m_1-1 < 48*[p]+48*\{p\} < 48*l+m_1$$

$$l+\frac{m_1-1}{48} < [p]+\{p\} < l+\frac{m_1}{48}$$

$$l < [p]+\{p\} < l+1 \text{ so}$$

$$l-\{p\} < [p] < l+1-\{p\},$$

and given that $0 \leq \{p\} < 1$ then $l-1 < [p] < l+1$, that means $l = [p]$

So if finding two real numbers p and a that satisfy relations (2) and (3) then:

$l = [k/48] = [p]$ (4)

Now:

$$\frac{1}{48} = \frac{1}{2^4} * \frac{1}{2^2-1} = \frac{1}{2^6} * \frac{1}{1-\left(\frac{1}{2}\right)^2} =$$

$$\frac{1}{2^6} * \sum_{n=0}^{\infty} \left(\frac{1}{2^2}\right)^n = \frac{1}{2^6} * \left(1 + \frac{1}{2^2} + \frac{1}{2^4} + \frac{1}{2^6} + \frac{1}{2^8} + \frac{1}{2^{10}} + \ldots \right)$$

Here the largest data packet size will be represented by a 16-bit number, so $$k \leq 2^{16}-1 \text{ and } k_1 \leq 2^{16}.$$

$$k_1 * \frac{1}{48} = k_1 * \frac{1}{2^6} * \left(1 + \frac{1}{2^2} + \frac{1}{2^4} + \frac{1}{2^6} + \frac{1}{2^8} + \frac{1}{2^{10}} + \ldots\right) =$$

$$k_1 * \frac{1}{2^6} * \left(1 + \frac{1}{2^2} + \frac{1}{2^4} + \frac{1}{2^6} + \frac{1}{2^8} + \frac{1}{2^{10}} + \frac{1}{2^{12}} + \frac{1}{2^{14}}\right) +$$

$$k_1 * \frac{1}{2^6} * \left(\frac{1}{2^{16}} + \frac{1}{2^{18}} + \frac{1}{2^{20}} + \ldots\right) =$$

$$k_1 * \frac{1}{2^6} * \left(1 + \frac{1}{2^2} + \frac{1}{2^4} + \frac{1}{2^6} + \frac{1}{2^8} + \frac{1}{2^{10}} + \frac{1}{2^{12}} + \frac{1}{2^{14}}\right) + k_1 * \frac{1}{2^{16}} * \frac{1}{48}$$

and rewriting the above equation as:

$$k_1 * \frac{1}{48} = p + a$$

where:

$$p = k_1 * \frac{1}{2^6} * \left(1 + \frac{1}{2^2} + \frac{1}{2^4} + \frac{1}{2^6} + \frac{1}{2^8} + \frac{1}{2^{10}} + \frac{1}{2^{12}} + \frac{1}{2^{14}}\right); \quad (5)$$

and $$a = k_1 * \frac{1}{2^{16}} * \frac{1}{48},$$

which is the same as (2). Given the fact that $1 \leq k_1 \leq 2^{16}$, then a satisfies condition (3), for all $k_1 < 2^{16}$, and considering (4) and (5):

$$[k/48] = [p] = \left[k_1 * \frac{1}{2^6} * \left(1 + \frac{1}{2^2} + \frac{1}{2^4} + \frac{1}{2^6} + \frac{1}{2^8} + \frac{1}{2^{10}} + \frac{1}{2^{12}} + \frac{1}{2^{14}}\right)\right]$$

The result of the integral division of a 16-bit number k by 48 satisfying the condition $k+1 < 2^{16}$ (6), would be given by the integral part of the expression:

$$\left[(k+1) * \frac{1}{2^6} * \left(1 + \frac{1}{2^2} + \frac{1}{2^4} + \frac{1}{2^6} + \frac{1}{2^8} + \frac{1}{2^{10}} + \frac{1}{2^{12}} + \frac{1}{2^{14}}\right)\right]$$

Further modifying the above expression as follows:

$$\left[(k+1) * \frac{1}{2^6} * \left(1 + \frac{1}{2^2} + \frac{1}{2^4} + \frac{1}{2^6}\right) * \left(1 + \frac{1}{2^8}\right)\right] = \left[(k+1) * \frac{1}{2^6} * \left(1 + \frac{1}{2^2}\right) * \left(1 + \frac{1}{2^4}\right) * \left(1 + \frac{1}{2^8}\right)\right] = \left[(k+1) * \frac{1}{2^{20}} * (1 + 2^2) * (1 + 2^4) * (1 + 2^8)\right] = \left[\frac{(k+1) * (1 + 2^2) * (1 + 2^4) * (1 + 2^8)}{2^{20}}\right]$$

The value of the denominator will be a number less than $2^{32}$ (i.e., can be represented as a 32-bit number), as:

$$(k+1) < 2^{16} \text{ and}$$

$$(1+2^2)*(1+2^4)*(1+2^8) < 2^{15}.$$

So the 32-bit additions and 32-bit left shifts needed to calculate the value of the denominator are:

y=k y=y+1 z=y<<2 y=y+z z=y<<4 y=y+z z=y<<8 y=y+z, and to end the calculation of [p], perform a last right shift: y=y>>20.

Thus for any number k such that: $k < 2^{16}-1$ the quotient for dividing by integer number 48 is determined. Additionally, for $k = 2^{16}-1$ the determined quotient is also valid.

Thus the combination of four addition operations and four bit-level shift operations, which correspond to instructions included in the division process 18, for dividing any 16-bit number by integer "48" is determined. In one example, the instructions included in the division process 18 is shown below as a sequence of microcode instructions capable of being executed on a microengine, such as the microengines included in the array of sixteen microengines 28 shown in FIG. 1.

.reg tmp, tmp1
alu[tmp1, k, +, 1]
alu[tmp, --, B, tmp1, <<2]
alu[tmp, tmp, +, tmp1]
alu[tmp1, --, B, tmp, <<4]
alu[tmp, tmp, +, tmp1]
alu[tmp1, --, B, tmp, <<8]
alu[tmp, tmp, +, tmp1]
alu[tmp, --, B, tmp, >>20]

Figure 2:
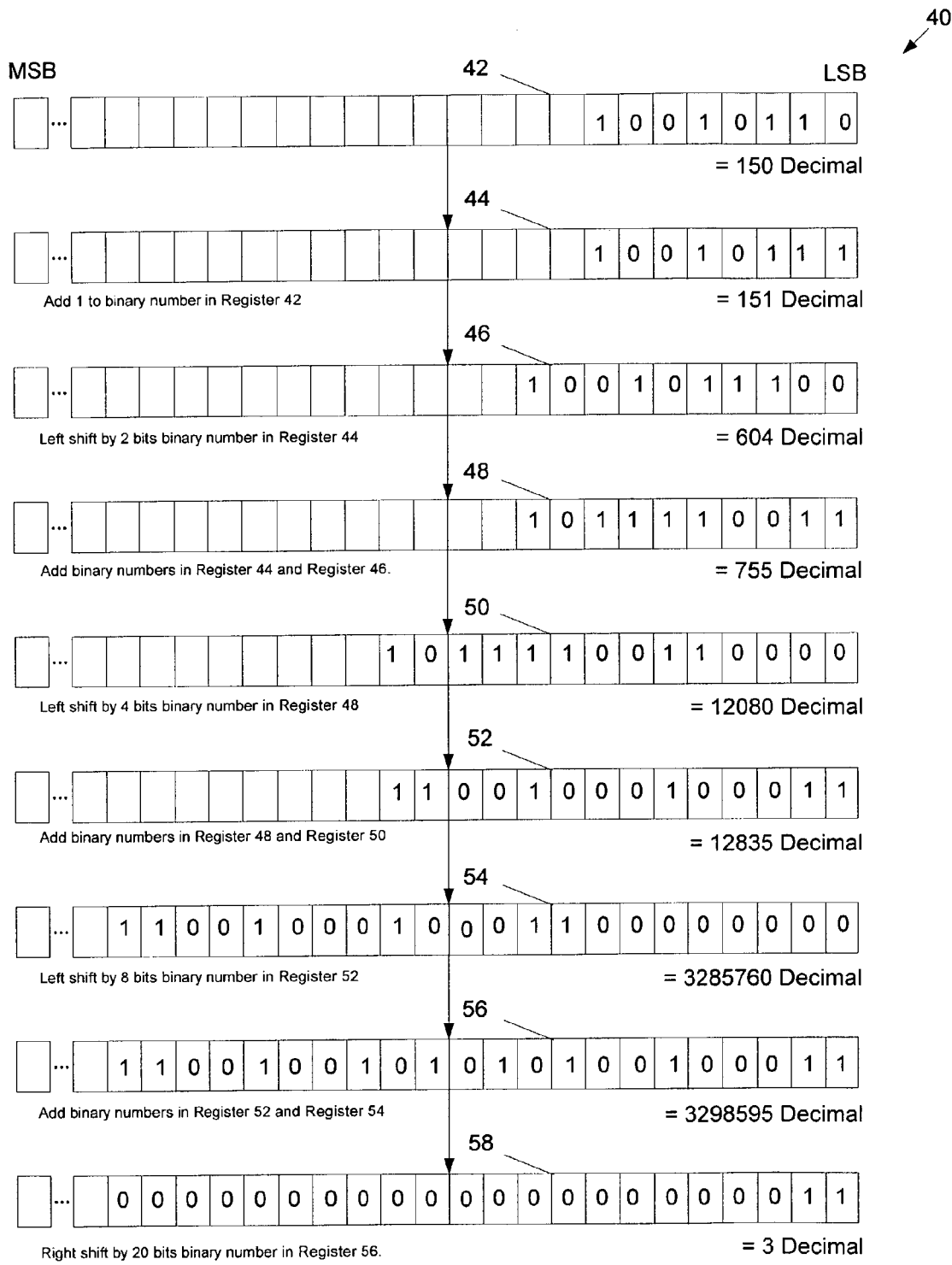
FIG. 2 is a series of diagrams pictorially depicting registers dividing a data packet length by integer number 48.

Referring to FIG. 2 a series of bit-level register operations used by division process 18 (shown in FIG. 1), to divide a binary number that represents the length of a data packet, such as the data packet 22 (shown in FIG. 1), by integer number "48" is shown. To divide by integer number "48", a combination of four addition instructions and four bit-level shift instructions are executed on the binary number representing the data packet length. Typically each of the eight instructions needs one clock cycle to execute. Thus, the division executes in 8 clock cycles. However, in some arrangements one or more additional clock cycles are needed to move a binary number into or out of one or more of the registers.

In this particular example, a data packet is 150 bytes long and the number "150" is represented in register 42 in as a binary number where the right-most position of the register is the least-significant bit LSB (i.e., $2^0$) and the left-most position is the most-significant bit MSB (i.e., $2^{31}$) of the 32 bit wide register. As mentioned, typically the data packet length is represented by a 16-bit number and typically 32-bit wide registers are used to divide the 16-bit number by the integer number "48" so that the 16-bit number is capable of being shifted on a bit-level without overflowing a register.

In register 42 the 150-byte data packet length is represented by the binary number "10010110." As mentioned the division process 18 (shown in FIG. 1) includes four addition instructions and four bit level shift instructions that are each included in the reduced instruction set of the microengine array 28 (also shown in FIG. 1) of the network processor 20 (also shown in FIG. 1). The first instruction to initiate dividing the data packet length by integer number 48 is adding "1" to the binary number present in register 42 and placing the result in register 44. In this particular example the result of the first addition, decimal number "151", is represented in register 44 by the corresponding binary number "10010111". After executing the first addition instruction, binary number stored in register 44 is left-shifted by 2 bits and stored in register 46. In this example, as the binary number is left-shifted by the 2 bits, binary number "0" fills the two least-significant bits. Typically, left-shifting a binary number is equivalent to multiplying the un-shifted number by a factor of 2 raised to a power of the number of left shifts (i.e., $2^{number\ of\ left\ shifts}$). In this case, the binary number is left-shifted by two bits, which is equivalent to multiplying by a factor of 4 (i.e., $2^2$). So the binary number in register 46 represents the decimal number "604" (i.e., 151 multiplied by 4). After the executing the left-shift by 2 bits instruction, which is the first of the four bit-level shifting instructions, the second addition instruction is executed. When executed, the second addition instruction adds the binary number in register 44 with the binary number in register 46 and stores the result in register 48. In this particular example, the binary equivalents of the decimal number "151" (i.e., the binary number stored in register 44) and the decimal number "604" (i.e., the binary number stored in register 46) are added to produce the decimal number "755", which corresponds to the binary number stored in register 48.

After the second of the four addition instructions is executed, the binary number stored in register 48 is left-shifted by four bits and the binary number produced is stored in register 50. Left-shifting by four bits the binary number in register 48 is equivalent to multiplying by a factor of 16 (i.e., $2^4$). In this particular example the binary number in register 48 represents the decimal number 755 and by left-shifting the number by 4 bits, the binary number stored in register 50 represents the decimal number 12080 (i.e., 755 multiplied by 16). After the second of the four shift instructions is executed, the third addition instruction is executed. The third addition instruction adds the binary number in register 48 with the binary number in register 50 and stores the binary number produced in register 52. In this particular example, the binary number in register 48 (i.e., decimal number 755) and the binary number in register 50 (i.e., decimal number 12080) add to produce the binary number (i.e., decimal number 12835) that is stored in register 52. After the third of the four addition instructions is executed, the third shift instruction is executed with the binary number stored in register 52. The third shift instruction left-shifts the binary number in register 52 by 8 bits and stores the shifted binary number in register 54. By left-shifting the binary number stored in register 52 (i.e., decimal number 12835) by 8 bits is equivalent to multiplying the number by decimal number 256 (i.e., $2^8$). In this particular example, the binary number shifted by 8 bits is stored in register 54 and is equivalent to decimal number 3285760.

After executing the third bit-level shift instruction, the fourth addition instruction is executed by adding the binary number in register 52 and the binary number in register 54. The binary number produced from the addition is stored in register 56. In this particular example, the binary number (i.e., decimal number 12835) in register 52 and the binary number (i.e., decimal number 3285760) in register 54 add to equal the binary number (i.e., decimal number 3298595) stored in register 56. After the fourth addition instruction is executed, the binary number stored in register 56 is right-shifted by 20 bits and the binary number produced is stored in register 58. Right-shifting the binary number in register 56 by 20 bits is equivalent to dividing the decimal equivalent of the binary number by a factor of 1048576 (i.e., $2^{20}$). In this particular example, as the binary number in register 56 is right-shifted by twenty bits, a binary number 0 fills each position of register 58 that no longer contains the binary number. In this example, the binary number in register 58 is equivalent to decimal number 3 and represents the 150-byte length of the data packet divided by the integer number 48.

By using the combination of the four addition instructions and the four shifting instructions, an integral division of the data packet length by the integer number 48 is executed and the remainder portion of the division is truncated while the quotient portion of the division (i.e., decimal number 3) is stored in register 58. So, in this example, the division process 18 (shown in FIG. 1) determined that the integer number 150 divided by integer number 48 produces a quotient of integer number 3.

However, in some arrangements the remainder portion of the division by integer number 48 represents a portion of the data present in the received data packet 22 (shown in FIG. 1) and is used to determine the number of fixed-length cells needed for distributing the data included in the data packet onto the ATM network 14 (also shown in FIG. 1). To account for the remainder portion, the quotient portion resulting from the division is rounded-up. Typically, to round up the quotient portion, the dividend (i.e., the length of the data packet) is added to one less the divisor (i.e., integer number 47) prior to dividing by the divisor (i.e., integer number 48). So, to account for the remainder portion, the binary number stored in register 42 is added with the integer number 48 (i.e., 1+integer number 47) instead of just integer number 1 for the first addition operation and the resulting binary number (i.e., decimal number 198) is stored in register 44. By performing the remaining three binary additions and four binary shift operations using registers 44-58, the resulting rounded-up binary quotient in register 58 represents decimal number 4. So, to distribute the 150-byte long data packet, including the remainder portion, onto the ATM network 14 (shown in FIG. 1), four fixed-length cells are needed.

However, by adding one less the divisor (i.e., integer number 47) to the dividend (i.e., the length of the data packet) the range of integer numbers capable of being divided by integer number 48 with the four binary additions and four binary shift operations is reduced. In particular the range of integer numbers representing the data packet length reduces to integer numbers between 0 and 65488 (i.e., 65536–48). Consequentially, by adding one less the divisor for producing a rounded-up quotient, division by integer number 48 using the four binary additions and four binary shift operations does not produce a valid rounded-up quotient for the integer number 65521 representing the data packet length. So prior to dividing by integer number 48, the received data packet length is compared to the integer number 65521. If determined that the data packet length is the integer number 65521, a previously determined rounded-up quotient of integer number 1366 is used as the resulting number of fixed-length cells.

Figure 3:
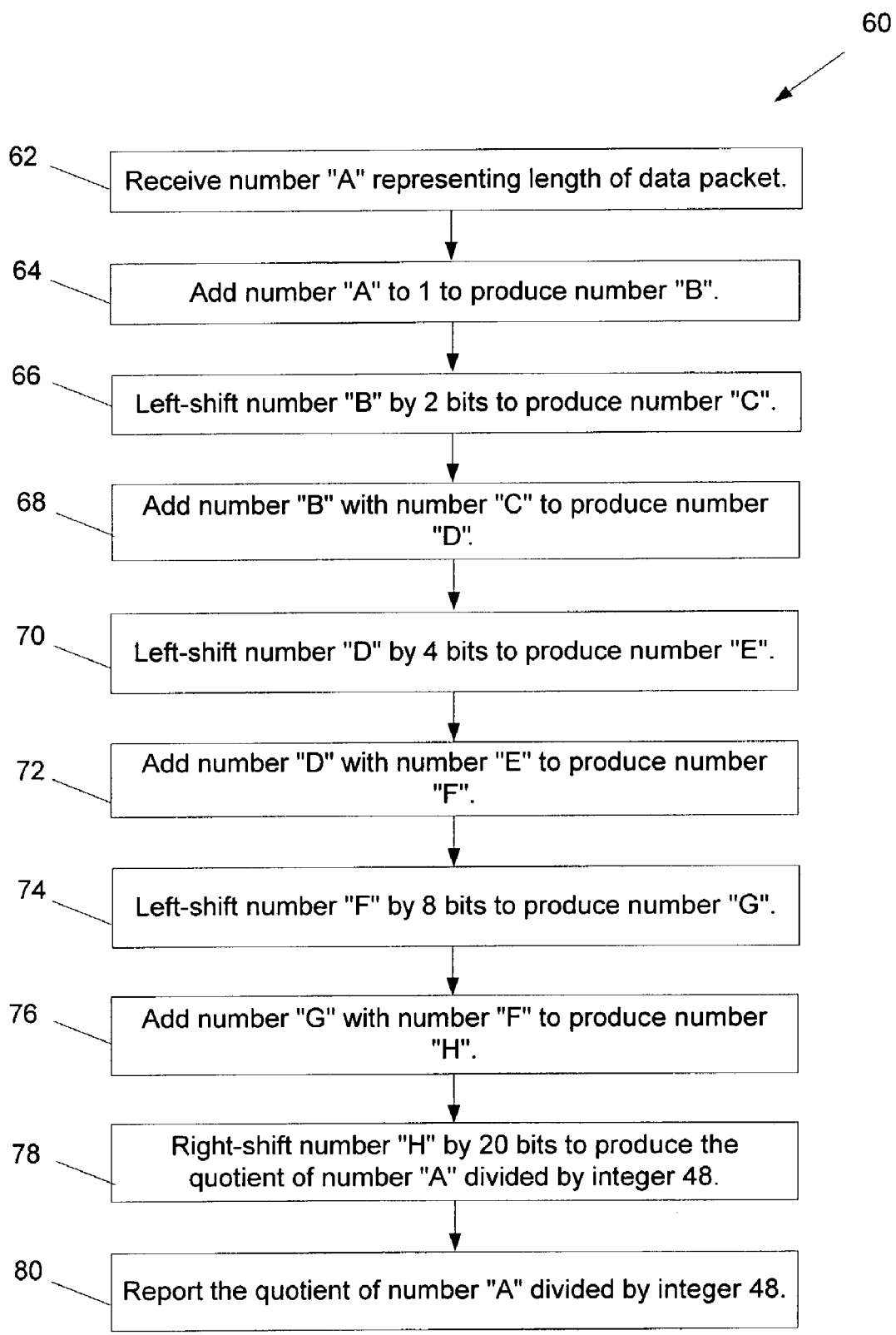
FIG. 3 is a flow chart of an integral division by 48 process.

Referring to FIG. 3, a generalized description of division process 60 includes (62) receiving a number "A" that represents the length of a data packet such as the data packet 22 (shown in FIG. 1). After receiving (62) the number "A", the division process 60 adds (64) one to the number "A" to produce the number "B". After adding (64) one to number "A" to produce the number "B", the division process 60 left-shifts (66) the number "B" by 2 bits to produce the number "C".

Typically, by left-shifting the number "B" by 2 bits the number is multiplied by a factor of 4 (i.e., $2^2$). After left-shifting (66) the number by 2 bits to produce number "C", the division process 60 adds (68) the number "B" with the number "C" to produce the number "D". Once the number "D" is produced, the division process 60 left-shifts (70) the number "D" by 4 bits to produce the number "E". Typically by left-shifting a number by 4 bits is equivalent to multiplying the number by a factor of 16 (i.e., $2^4$). After left-shifting (70) the number "D" by 4 bits to produce the number "E", the division process 60 adds (72) the number "D" with the number "E" to produce the number "F". After producing the number "F", the division process 60 left-shifts (74) the number "F" by 8 bits to produce the number "G". Typically, by left-shifting a number by 8 bits is equivalent to multiplying the number by a factor of 256 (i.e., $2^8$). After left-shifting (74) the number "F" by 8 bits, the division process 60 adds (76) the number "G" with the number "F" to produce the number "H". After producing the number "H", the division process 60 right-shifts (78) the number "H" to the right by 20 bits to produce the quotient of the division by integer 48. Typically by shifting a number to the right by 20 bits is equivalent to dividing the number by a factor of 1048576 (i.e., $2^{20}$). After right-shifting (78) the number "H" by 20 bits to determine the quotient of the division by integer number 48, in some arrangements the division process 60 reports (80) the quotient for use in one or more other processes.

The processes described herein can be implemented in digital electronic circuitry, or in computer hardware, firmware, software, or in combinations of them. The processes described herein can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Methods can be performed by one or more programmable processors executing a computer program to perform functions of the invention by operating on input data and generating output. The method can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The processes described herein can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The processes described herein can also be implemented in other electronic devices individually or in combination with a computer or computer system. For example, the processes can be implemented on mobile devices (e.g., cellular phones, personal digital assistants, etc.).

The invention has been described in terms of particular embodiments. Other embodiments are within the scope of the following claims. For example, the steps of the invention can be performed in a different order and still achieve desirable results.

What is claimed is:

1. A method executed in a computing device for dividing by the integer number 48 to identify a number of fixed-length data cells, the method comprising:

receiving a first number representing a length of a data packet; and using the first number in a combination of four additions and four bit-level shifts to produce a quotient representing a number of fixed-length data cells for storing contents of the data packet.

2. The method of claim 1, wherein the four additions include adding one to the first number to produce a second number.

3. The method of claim 2, wherein the four additions include adding the first number with the second number.

4. The method of claim 1, wherein the four bit-level shifts include shifting a second number by a number of bits to the left.

5. The method of claim 4, wherein the number of bits includes two bits.

6. A method executed in a computing device for dividing by the integer number 48 to identify a number of fixed-length data cells, the method comprising:
- receiving a first number in a first register that represents a length of a data packet;
- adding the first number with one to produce a second number in a second register;
- left-shifting the second number by two bits to produce a third number in a third register;
- adding the third number with the second number to produce a fourth number in a fourth register;
- left-shifting the fourth number by four bits to produce a fifth number in a fifth register;
- adding the fifth number with the fourth number to produce a sixth number in a sixth register;
- left-shifting the sixth number by eight bits to produce a seventh number in a seventh register;
- adding the seventh number with the sixth number to produce an eighth number in a eighth register; and
- right-shifting the eighth number by twenty bits to produce a quotient that represents a number of fixed-length data cells for storing contents of the data packet.

7. The method of claim 6, wherein the first through eighth registers are in the same computing device.

8. The method of claim 6, wherein at least some of the first through eighth registers are in different computing devices.

9. The method of claim 6, wherein the first through eighth registers are in a shared register stack accessible by different computing devices.

10. The method of claim 6, wherein the first number includes a value between 0 and 65535.

11. The method of claim 6, wherein the first number includes a sixteen bit binary number.

12. The method of claim 6, wherein the quotient represents the number of fixed-length data cells capable of being transmitted on an asynchronous transfer mode (ATM) network.

13. A computer program product, tangibly embodied in an information carrier, for dividing by the integer number 48 to identify a number of fixed-length data cells, the computer program product being operable to cause a machine to:
- receive a first number representing a length of a data packet; and
- use the first number in a combination of four additions and four bit-level shifts to produce a quotient representing a number of fixed-length data cells for storing contents of the data packet.

14. The computer program product of claim 13, wherein the four additions include adding one to the first number to produce a second number.

15. The computer program product of claim 14, wherein the four additions include adding the first number with the second number.

16. The computer program product of claim 13, wherein the four bit-level shifts include shifting a second number by a number of bits to the left.

17. The computer program product of claim 16, wherein the number of bits includes two bits.

18. A computer program product, tangibly embodied in an information carrier, for dividing by the integer number 48 to identify a number of fixed-length data cells, the computer program product being operable to cause a machine to:
- receive a first number representing a length of a data packet in a first register;
- add the first number with one to produce a second number in a second register;
- left-shift the second number by two bits to produce a third number in a third register;
- add the third number with the second number to produce a fourth number in a fourth register;
- left-shift the fourth number by four bits to produce a fifth number in a fifth register;
- add the fifth number with the fourth number to produce a sixth number in a sixth register;
- left-shift the sixth number by eight bits to produce a seventh number in a seventh register;
- add the seventh number with the sixth number to produce an eighth number in an eighth register; and
- right-shift the eighth number by twenty bits to produce a quotient representing a number of fixed-length data cells for storing contents of the data packet.

19. The computer program product of claim 18, wherein the first through eighth registers are in the same computing device.

20. The computer program product of claim 18, wherein at least some of the first through eighth registers are in different computing devices.

21. The computer program product of claim 18, wherein the first through eighth registers are in a shared register stack accessible by different computing devices.

22. The computer program product of claim 18, wherein the first number includes a value between 0 and 65535.

23. The computer program product of claim 18, wherein the first number includes a sixteen bit binary number.

24. The computer program product of claim 18, wherein the quotient represents the number of fixed-length data cells capable of being transmitted on an asynchronous transfer mode (ATM) network.

25. A division process residing in a computing device for dividing by the integer number 48 to identify a number of fixed-length data cells, comprising:
- a receiving process to receive a first number representing a length of a data packet;
- an adding process to use the first number in four additions; and
- a shifting process to use the first number in four bit-level shifts to produce a quotient representing a number of fixed-length data cells for storing contents of the data packet.

26. The division process of claim 25, wherein the four additions include adding one to the first number to produce a second number.

27. The division process of claim 26, wherein the four additions include adding the first number with the second number.

28. The division process of claim 25, wherein the four bit-level shifts include shifting a second number by a number of bits to the left.

29. The division process of claim 28, wherein the number of bits includes two bits.

30. A division process residing in a computing device for dividing by the integer number 48 to identify a number of fixed-length data cells, comprising:
- a receiving process to receive a first number representing a length of a data packet in a first register;
- a first adding process to add the first number with one to produce a second number in a second register;
- a first shifting process to left-shift the second number by two bits to produce a third number in a third register;
- a second adding process to add the third number with the second number to produce a fourth number in a fourth register;
- a second shifting process to left-shift the fourth number by four bits to produce a fifth number in a fifth register;

a third adding process to add the fifth number with the fourth number to produce a sixth number in a sixth register;

a third shifting process to left-shift the sixth number by eight bits to produce a seventh number in a seventh register;

a fourth adding process to add the seventh number with the sixth number to produce an eighth number in an eighth register; and a fourth shifting process to right-shift the eighth number by twenty bits to produce a quotient representing a number of fixed-length data cells for storing contents of the data packet.

31. The division process of claim 30, wherein the first through eighth registers are in the same computing device.

32. The division process of claim 30, wherein at least some of the first through eighth registers are in different computing devices.

33. The division process of claim 30, wherein the first through eighth registers are in a shared register stack accessible by different computing devices.

34. The division process of claim 30, wherein the first number includes a value between 0 and 65535.

35. The division process of claim 30, wherein the first number includes a sixteen bit binary number.

36. The division process of claim 30, wherein the quotient represents the number of fixed-length data cells capable of being transmitted on an asynchronous transfer mode (ATM) network.

37. A system for dividing by the integer number 48 to identify a number of fixed-length data cells comprising:

a processor capable of receiving a first number representing a length of a data packet and using the first number in a combination of four additions and four bit-level shifts to produce a quotient representing a number of fixed-length data cells for storing contents of the data packet.

38. The system of claim 37, wherein the four additions include adding one to the first number to produce a second number.

39. The system of claim 38, wherein the four additions include adding the first number with the second number.

40. The system of claim 37, wherein the four bit-level shifts include shifting a second number by a number of bits to the left.

41. A system comprising:

a router capable of receiving a first number representing a length of a data packet; and a processor capable of using the first number in a combination of four additions and four bit-level shifts to produce a quotient representing a number of fixed-length data cells for storing contents of the data packet.

42. The system of claim 41, wherein the four additions include adding one to the first number to produce a second number.

43. The system of claim 42, wherein the four additions include adding the first number with the second number.

44. The system of claim 41, wherein the four bit-level shifts include shifting a second number by a number of bits to the left.

* * * * *